United States Patent [19]

Jefferies

[11] Patent Number: 4,484,083
[45] Date of Patent: Nov. 20, 1984

[54] ELECTRIC DRIVE TRAIN FOR A VEHICLE

[76] Inventor: Peter N. Jefferies, 14A Cranley Gardens, South Kensington, London SW7, England

[21] Appl. No.: 380,673
[22] PCT Filed: Sep. 2, 1980
[86] PCT No.: PCT/GB80/00135
§ 371 Date: Apr. 30, 1982
§ 102(e) Date: Apr. 30, 1982
[87] PCT Pub. No.: WO82/00928
PCT Pub. Date: Mar. 18, 1982

[51] Int. Cl.³ .................... B60L 11/14; H02K 23/60; H02K 17/24
[52] U.S. Cl. .................... 290/45; 290/4 R; 290/50; 180/65.4; 310/261; 318/696
[58] Field of Search .................... 290/4 C, 49, 5, 50, 290/6, 8, 45; 318/9, 10, 11, 12, 13, 139, 335, 358, 696; 187/9 R; 60/715; 417/45; 74/843, 7 C; 180/65 A; 310/261

[56] References Cited

U.S. PATENT DOCUMENTS

| | | | |
|---|---|---|---|
| 3,030,517 | 4/1962 | Gibbons | 290/4 R |
| 3,789,281 | 1/1974 | Shibata | 290/49 X |
| 3,904,883 | 9/1975 | Horwinski | 290/49 X |
| 4,309,620 | 1/1982 | Bock | 290/45 X |

FOREIGN PATENT DOCUMENTS 2353724 5/1974 Fed. Rep. of Germany .
2501386 7/1976 Fed. Rep. of Germany .

OTHER PUBLICATIONS

G. Thomas, "Some Hybrid Propulsion Systems for Road Vehicles", *Electronics and Power*, Feb. 1977, pp. 125–128.

*Primary Examiner*—B. Dobeck
*Assistant Examiner*—Terry Flower
*Attorney, Agent, or Firm*—Roylance, Abrams, Berdo & Goodman

[57] ABSTRACT

A transmission drive has a flywheel component and includes an electrical machine in the transmission path having an armature adapted for independent rotation with the driving side of the transmission drive and an independently rotatable field structure rotatable with the driven side of the transmission drive. In a vehicle drive train the field structure of the transmission drive is connected to a rotatable shaft driven by a heat engine operated at constant RPM and speed variation is effected by electrical control means connected to the armature which regulates the armature current during relative movement of the field structure and the armature thereby varying the power transmitted to the driving side.

2 Claims, 4 Drawing Figures

ELECTRIC DRIVE TRAIN FOR A VEHICLE

FIELD OF THE INVENTION

This invention relates relates to a drive train particularly for use in a vehicle.

BRIEF DISCUSSION OF THE PRIOR ART

Traditionally the main contender for an alternative to the heat engine has been electrical traction. However the prohibitive inadequacy of electrical traction has been the low on-board energy storage capacity. Thus chemical fuel on-board storage of energy is considered the only practical source of power for the majority of road vehicles.

It is known that a heat engine such as a diesel engine, a spark ignition petrol engine or gas turbine produces maximum power over a relatively narrow range of rotational speeds. Similarly the efficiency of such an engine reaches its maximum value at a particular speed.

Also of particular importance is the control of pollutant engine emissions to the atmosphere. Since the composition of the engine exhaust varies with engine speed the design of an efficient pollution free engine or the design of a catalytic exhaust treatment device becomes considerably more difficult if the engine is to be run at widely varying speeds.

SUMMARY OF THE PRESENT INVENTION

According to the present invention a drive train comprises a primary drive, a rotatable shaft driven by said primary drive, a flywheel rotatable with the shaft for the storage of inertial energy thereby being operable to absorb or rapidly give up angular kinetic energy as required, clutch means between the primary drive and the flywheel, an electrically operated transmission comprising an electrical machine having a magnetic field structure and an independently rotatable armature, one of the field structure and armature being connected to the driven shaft and the other being connected to a rotatable drive shaft, for rotation about a common axis, an electrical storage cell, and electrical control means connected with the electrical machine and with the electrical storage cell, for regulating current and thereby controlling the power transmitted to the drive shaft such that when it is desired to rotate the drive shaft at a speed of rotation less than the speed of rotation of the driven shaft then the electrical control means is operated so as to cause excess power to be tapped to the electrical storage cell to be stored thereby whereas, when it is desired to rotate the drive shaft at a speed of rotation greater than the speed of rotation of the driven shaft, the electrical control means is operated so as to cause the power required in excess of the power provided by the primary drive to be tapped from the electrical storage cell.

The drive train of the invention when in a vehicle enables power to be shared between the wheels and the batteries during use; in other words, power not required is stored by the batteries for later use.

Thus, although torque generated by the primary drive unit is transmitted to the wheels, the power is varied by the electric transmission to permit regulation of speed.

The regulation of the power is effected by an electrical control means regulating the armature current which determines the generator torque and hence the torque applied to the wheels.

The drive train includes a clutch between the primary drive and the flywheel so that an internal combustion primary drive may be started by disengaging the clutch and passing current to the armature to cause rotation of the flywheel. The clutch is then engaged, and the inertia of the flywheel is sufficient to turn over the primary drive unit. The field structure is now driven by the primary drive unit and rotates relative to the armature causing the generation of electrical current. Thus with the wheels braked the relative velocity of the field structure and the armature is at its maximum and the electrically operated transmission is generating at maximum capacity.

As soon as the armature is released the generator reaction torque causes rotation of the armature in the same direction as the field structure. The speed of rotation of the armature is then controlled by the electrical control device which is used to tap electrical power to the battery so that only a proportion of the power generated is available for use in driving the armature and thus the wheels of a vehicle. At a cruising speed where the armature and field structure are rotating together no electric current is tapped by the control device so that all the power from the heat engine passes to the wheels. In fact in practice at this crusing speed a certain amount of electricity is fed from the batteries to the armature to provide the torque required of the electrical unit.

If it is desired to increase velocity this may be done for a limited period, by supplying current from the battery to the armature so that the transmission operates as an electric motor.

The advantage of this arrangement is the ability of the drive train to have a primary drive unit operating at constant RPM whilst varying the speed of the vehicle. Moreover the ability of the electrically operated transmission to generate electricity below cruising speed overcomes the difficulties previously encountered by electrical traction.

BRIEF DESCRIPTION OF THE DRAWINGS

The invention will now be described by way of example with reference to the accompanying drawings in which.

DESCRIPTION OF THE PREFERRED EMBODIMENTS

Figure 1:
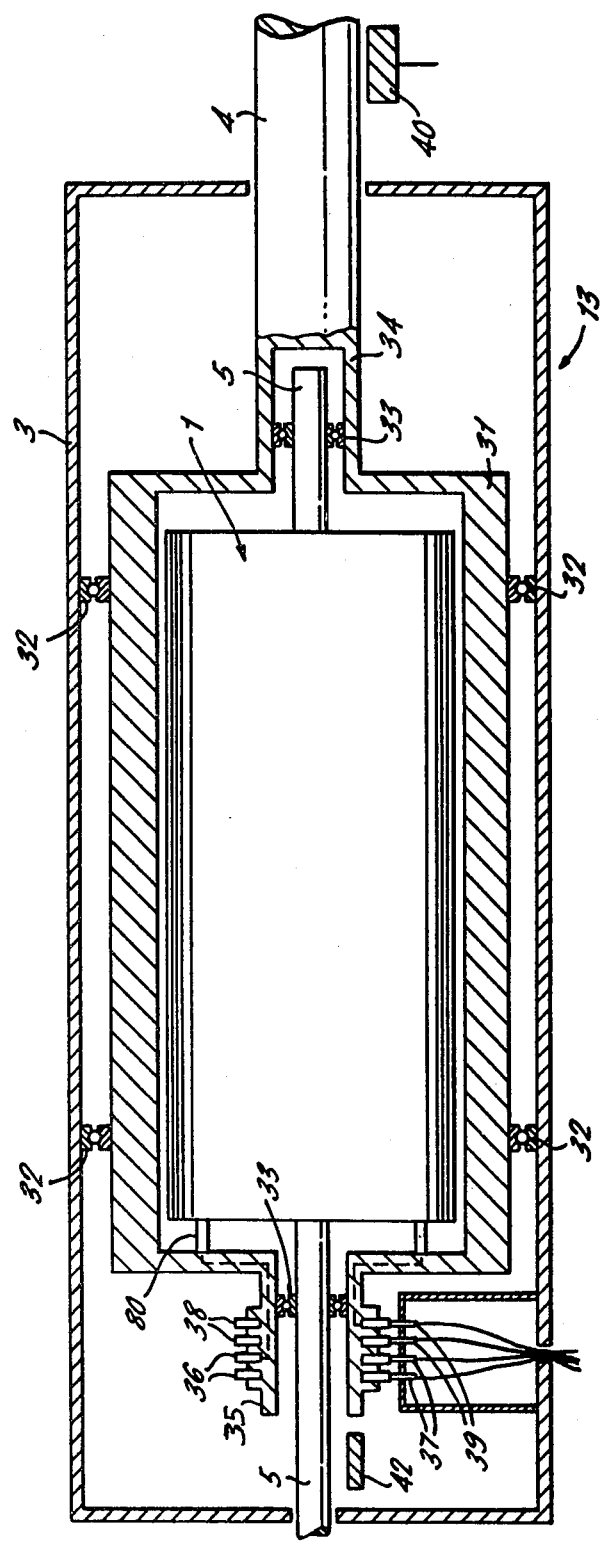
FIG. 1 is a cross-sectional elevation of an electrically operated transmission for a drive-train according to the invention.
Figure 2:
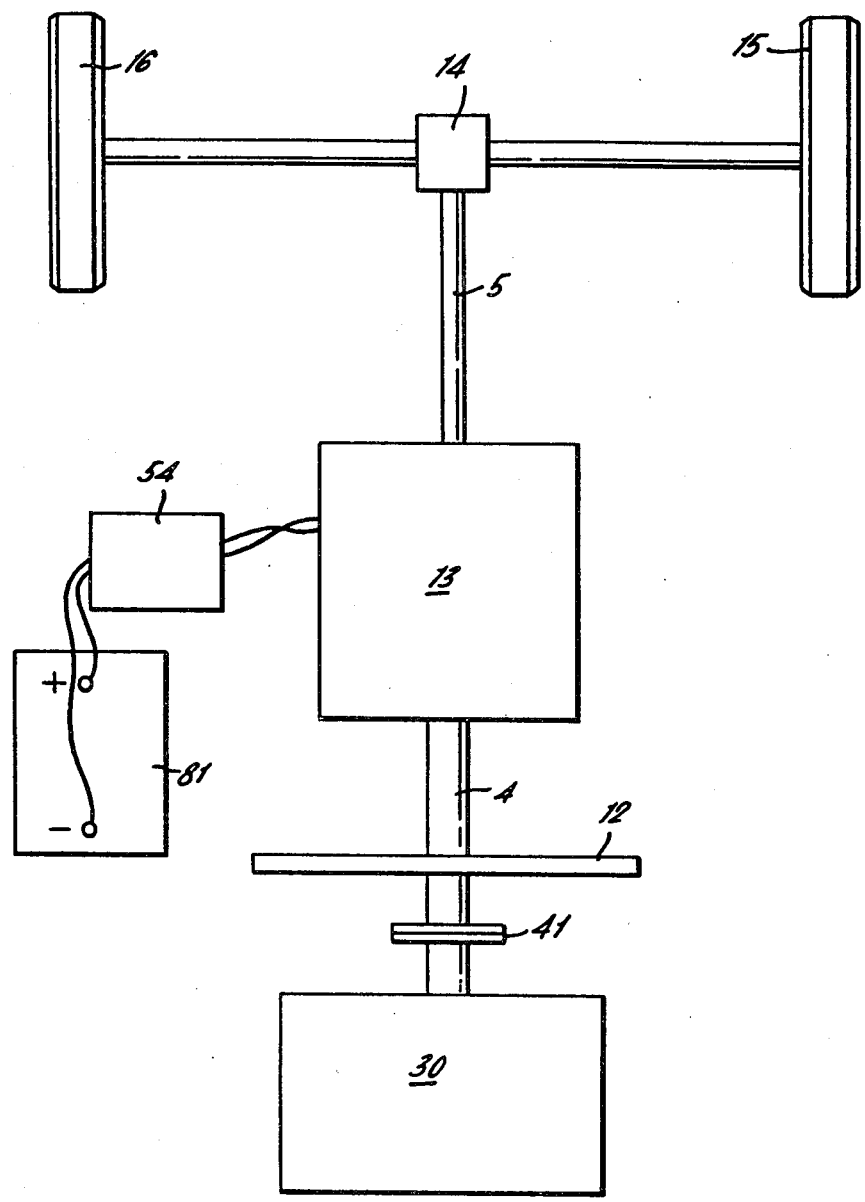
FIG. 2 is a schematic diagram of a drive-train employing the electrically operated transmission.
Figure 3:
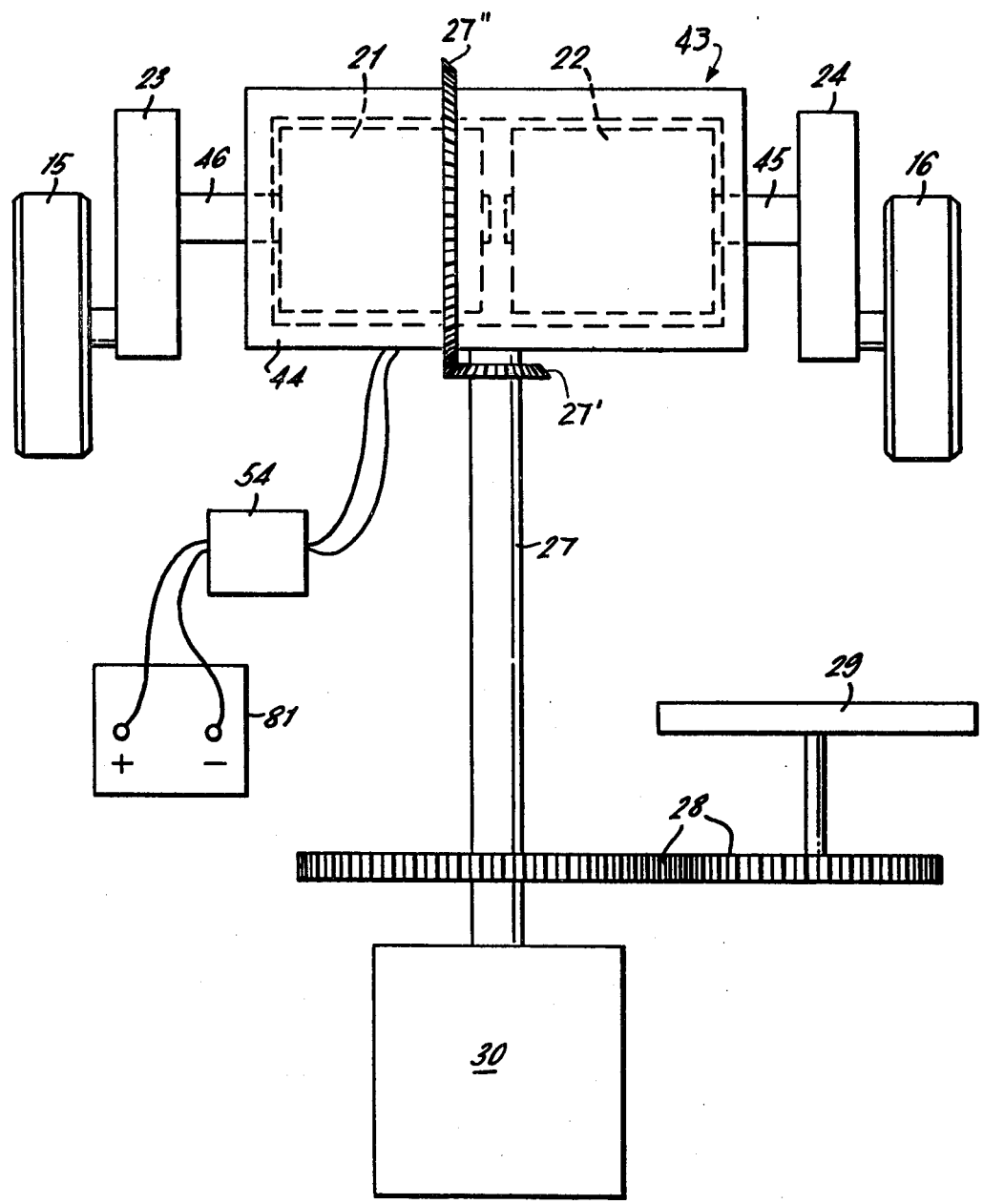
FIG. 3 is a schematic diagram of a further vehicle drive-train wherein, in an alternative embodiment of the invention, the transmission-drive unit functions as a differential unit.

In FIG. 1, the input shaft 4 is driven, usually at constant speed, by a heat engine 30 (shown in FIGS. 2 and 3). The casing 3 of the transmission-drive unit 13 is fixed to the chassis of the vehicle (not shown) and a field structure 31 is connected to the shaft 4 and is free to rotate in the bearings 32. Within the hollow field structure 31, lies an armature 1 the central shaft 5 of which is free to rotate in the two sets of bearings 33 mounted, respectively, in a hollow section 34 of the input shaft 4 and a tubular member 35, the parts 34 and 35 being concentric with the shaft 5 and connected to the field structure.

An electrical current connection for the armature 1 and, in this case an electromagnetic field structure is made by brushes 37 and 39 which makes sliding contact with slip rings 36 and 38. One of each of the slip rings 36 and 38 are connected to brushes 80 which are in electrical connection with their respective armature coils (not shown).

In use of the unit 13 as a transmission unit electrical contact is made between the brushes 39; electrical contact is also made between the brushes 37. Electrical currents induced in the armature coils by the rotation of the field structure 31 circulate in the armature coils and their electromagnetic linkage with the armature 1 tends to cause the armature 1 and the associated shaft 5 to rotate in the same direction as the input shaft 4. However in the stopped position of a vehicle the armature is prevented from rotation by a brake 42 acting upon the shaft 5. Thus electricity is generated and transmitted to a battery source 81 (FIG. 2 or 3). The unit 13 may be operated as a conventional motor by disconnecting the shaft 4 from the drive unit 30 by operating a clutch 41 (see FIG. 2) and then braking the shaft 4 with a brake 40. This may be done, for example, by drawing current from the battery into the coils of the armature so that the unit becomes the sole power unit for the vehicle when driven over short distances around a town.

To start the drive unit 30, the brake 40 is released and electrical current applied to the armature 1 causing the field structure to rotate. Rotation of the field structure 31 causes rotation of a flywheel 12. The clutch 41 is then engaged and the inertia in the flywheel turns over the drive unit 30.

FIG. 2 shows a practical layout for a vehicle drive-train for a high efficiency vehicle using a combination of electrical drive for use around town (when the unit 13 is used as the sole drive unit) and for higher speed motorway cruising (when the drive unit 30 is used in conjunction with the unit 13, which unit may be used to provide acceleration or deceleration). Power from the output shaft 5 passes to the driven wheels 15 and 16 via a differential unit 14.

In the layout shown in FIG. 3, the differential unit may be a transmission-drive unit 43 which has two armatures 21 and 22, each capable of independent rotation and contained within the field structure 44. The field structure is driven via gears 27' and 27'' from the shaft 27. Power output from the unit 43 is fed to the driven wheels 15 and 16 via step-down gearboxes 23 and 24. A flywheel 29 is connected to the drive-unit output shaft 27 via the gear and clutch system 28. The flywheel operates to absorb or rapidly give up angular kinetic energy as required.

Thus, in conjunction with suitable electrical and mechanical control systems, the unit of the invention may be used to provide a vehicle drive-train exhibiting high efficiency and versatility.

Figure 4:
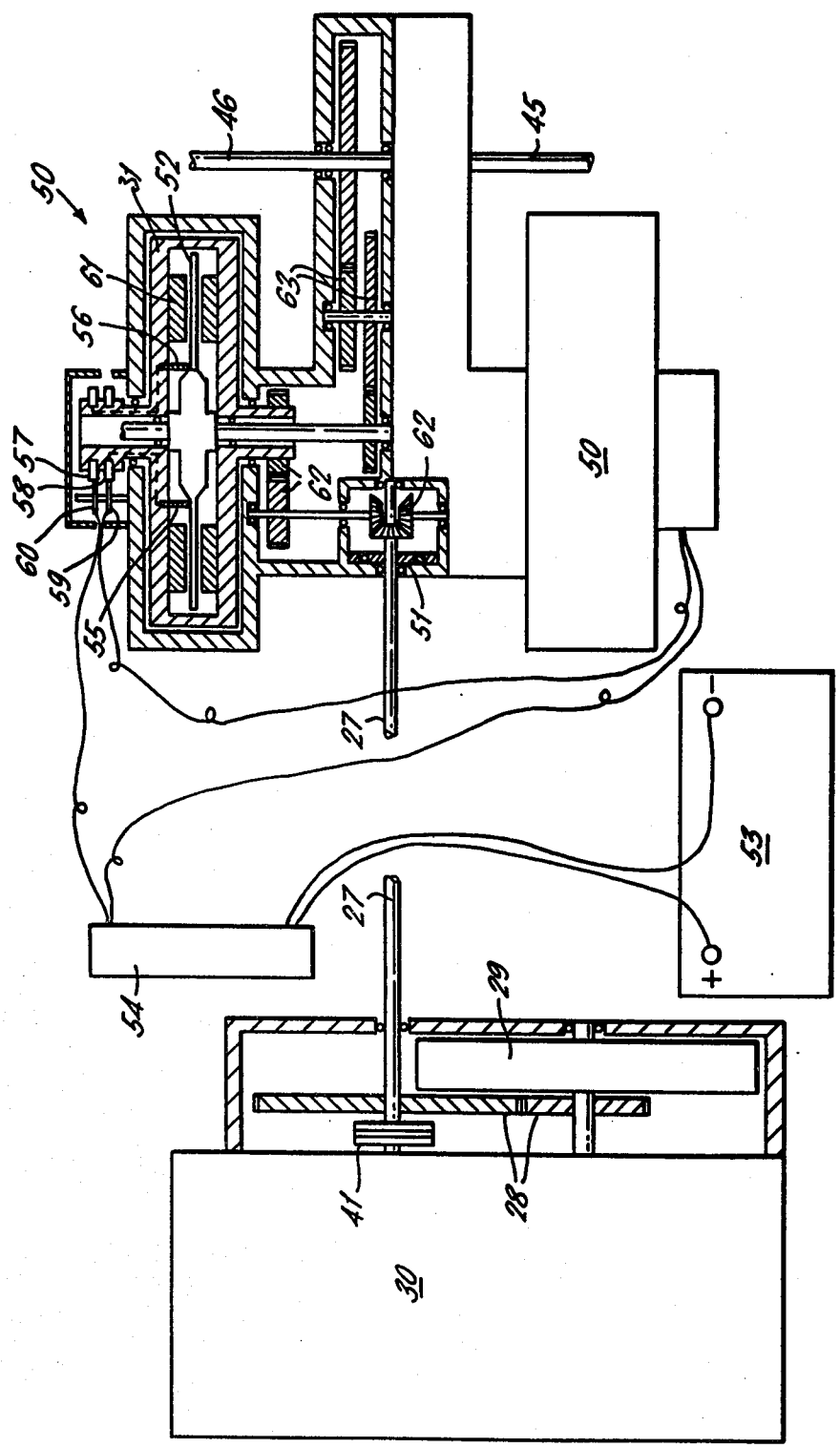
FIG. 4 is a schematic representation of a hybrid petro-electric vehicle drive-train with a flywheel, of the type shown in FIG. 3, and employing two disc armature DC transmission-drive units.

FIG. 4 shows in detail a preferred vehicle drive-train for practical operation. Two disc-armature DC transmission-drive units 50 are used so as to provide a differential action.

The engine 30 is designed to provide base load, i.e., total power requirement at cruising speed.

The transmission-drive units 50 are basically conventional electrical motors with both their armatures and field structures free to rotate, the field structures 31 being driven by the heat engine 30 and flywheel 29, and the armatures 52 driving the wheels on shafts 45 and 46. These armatures 52 are connected in series to provide the necessary differential element. Although many electrical motor designs could be used for this purpose, the disc-armature DC motor design is most suitable, having high efficiency both acting as motor or generator, high power/weight ratio, low volume, simplicity of construction (and thereby low manufacturing cost), high inertia of the field structure 31 and low inertia of the armature 52, and torque output directly proportional to armature current.

The electrically operated transmission units 50 can be arranged to match that of the engine to facilitate maximum energy recovery during standstill operation or can be varied to meet any specific operating requirement.

The clutch 41 is opened when the heat engine is not being used. When required, the flywheel 29 is run up to speed by the electrical transmission-drive unit at which time the clutch 41 is closed to start the heat engine 30.

A uni-directional clutch 51 also enables the system to run without the heat engine 30.

The size of battery 53 required is primarily governed by the maximum power absorption of the electrical transmission-drive unit 50.

During normal operation the heat engine 30 is run at constant speed and the vehicle's speed is controlled solely by the electrical transmission-drive unit. At standstill the field structure 31 is rotated by the heat engine 30 whilst the armature 52 is braked, thus power is generated and stored in the batteries 53.

When the armature 52 is released it tends to rotate in the same direction as the rotating field structure 31 and consequently drives the wheels, the torque being dependent on the armature current tapped by an electrical control 54. The electrical control 54 is a variable resistance which varies the amount of current tapped. The current is tapped through slip rings 57 and 58 and brushes 55 and 56 which cooperate with a commutator (not shown) on the armature 52. The DC current connection to the slip rings 57 and 58 is by cooperating brushes 60 and 59 respectively.

The field structure 31 consists of a series of sixteen permanent magnets 61 arranged adjacent to and on either side of the armature 52. The rotatable field structure 31 is driven by the shaft 27 through the unidirectional clutch 51 and the gears 62.

Drive from each armature 52 is fed to the respective output shaft 45 or 46 via the reduction gears 63. The power from the heat engine is divided between the wheels and the batteries at rates proportional to the vehicle speed.

Up to crusing speed the electricity generated by the relative velocity between the field structure 31 and the armature 52 is sufficient not only to drive the wheels but also to allow a certain amount of electricity to be tapped to replenish the batteries. The control of the sharing of power between the wheels and the batteries is effected by altering the effective impedance of the electrical control 54. At cruising speed the field structure 31 and the armatures 52 rotate together, thus all the power from the heat engine 30 goes to the wheels with a trickle of power from the batteries 53 to provide the torque required of the electrical unit 50. Above cruising speed the batteries 53 provide the extra power.

During braking both the batteries 53 and the flywheel 29 are recharged. This is calculated to give a much higher regenerative efficiency than possible with just an electrical transmission-drive unit operating without a flywheel.

It is possible to use the system without the heat engine 30 for operation over limited ranges (dependent on battery capacity) up to cruising speed. This is most advantageous for short intown journeys where the resulting pollution free operation is particularly welcome; in addition to making unnecessary the use of the heat engine for what, as a result of the warming up period required, must be its most inefficient application. After such operation the batteries 53 can either be recharged by the heat engine 30 or directly from the mains.

As an electrical transmission-drive unit of the disc-armature DC motor design is capable of developing torque five times its rated value, there is no need for gear changes and the unit has an effective top power, ten times that of the heat engine with corresponding attractive performance characteristics.

The advantages of the present invention may be summarised as follows:

1. High efficiency with considerable fuel saving due to the primary drive being able to operate at constant RPM whilst variations in speed are effected by the transmission.
2. Low pollution because the pollution from the heat engine can more easily be reduced because it runs at constant speed.
3. Low maintenance: maintenance levels of electrical units are very low. Heat engines running at optimum speed generally requires much less maintenance.
4. Low cost: simplicity of construction results in low manufacturing cost, especially as the design incorporates only present day proven technology.
5. Compatibility with conventional road vehicle design.
6. Adaptability: to different heat engines, gas turbine, etc. to one, two, four or multi-wheel drive.

I claim:

1. A drive train comprising:
   a primary drive,
   a rotatable shaft driven by said primary drive,
   a flywheel rotatable with the shaft for the storage of inertial energy thereby being operable to absorb or rapidly give up angular kinetic energy as required,
   clutch means between the primary drive and the flywheel,
   an electrically operated transmission comprising an electrical machine having a rotatable magnetic field structure and an independently rotatable armature, one of the field structure and armature being connected to the driven shaft and the other being connected to a rotatable drive shaft, for rotation about a common axis,
   an electrical storage cell, and
   electrical control means connected with the electrical machine and with the electrical storage cell, for regulating current and thereby controlling the power transmitted to the drive shaft such that, when it is desired to rotate the drive shaft at a speed of rotation less than the speed of rotation of the driven shaft, then the electrical control means is operated so as to cause excess power to be tapped to the electrical cell to be stored thereby, whereas, when it is desired to rotate the drive shaft at a speed of rotation greater than the speed of rotation of the driven shaft, the electrical control means is operated so as to cause the power required in excess of the power provided by the primary drive to be tapped from the electrical storage cell.

2. A drive train according to claim 1 adapted to be used as a generator unit, and further comprising a brake unit, wherein the said one of the armature or the field structure which is connected to the drive shaft is prevented from rotating by the action of the brake unit, whereby, in use, electrical power induced by the relative rotation of the armature and the field structure is taken from the armature and stored in the electrical storage cell.

* * * * *